Figures 1, 2:
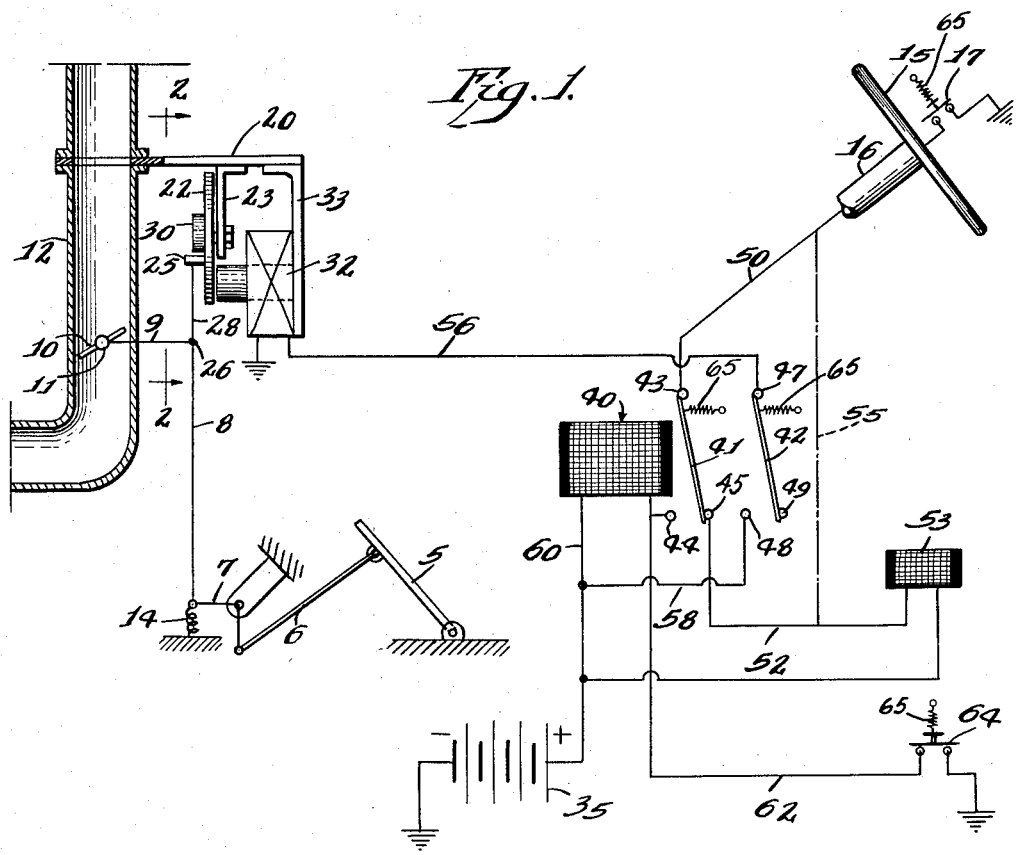

Jan. 13, 1959 — T. J. MUDON — 2,868,035
CONTROL SYSTEM FOR ACCELERATOR
Filed June 17, 1955

Inventor.
Thomas J. Mudon.
By Zabel, Baker, York, Jones and Dithmar
Attorneys.

United States Patent Office 2,868,035
Patented Jan. 13, 1959

2,868,035
CONTROL SYSTEM FOR ACCELERATOR
Thomas J. Mudon, East Chicago, Ind.

Application June 17, 1955, Serial No. 516,244

1 Claim. (Cl. 74—513)

This invention relates to a control system for an engine accelerator, and more particularly to a system which holds an accelerator in predetermined, advanced position for any desired length of time.

The invention is usable with the accelerator element of virtually any type of engine, but perhaps it will have its greatest usefulness in connection with the engine in a motor vehicle. The system of the invention when applied to a motor vehicle engine enables the operator to position the accelerator for predetermined vehicle speed, such for example as 50 M. P. H., and then remove his foot from the accelerator pedal. The system is held in operation by means of a push-button switch which is located conveniently for actuation by one of the operator's hands when in normal driving position.

Use of the control system permits the operator to remove his foot from the accelerator pedal and exercise his leg in a manner to prevent or reduce driving fatigue. This, of course, is accomplished without stopping the motor vehicle or unduly reducing its speed.

One object of the invention, therefore, is to provide a control system for an engine accelerator which is simple and inexpensive in construction and easy to install.

Another object is to provide such a control system which is particularly suitable for use in motor vehicles.

Still another object of the invention is to provide a control system which is extremely safe and foolproof in operation, particularly when used in a motor vehicle.

Another object of the invention is to provide such a system in a motor vehicle wherein the customary horn switch on the steering wheel is employed as an element of the system. In the event that the horn switch on the steering wheel is not equipped with a horn ring, it is contemplated that a switch of the system may be mounted on the steering wheel rim or one of the steering wheel spokes so that it is in convenient position for hand actuation during normal driving.

Still another object of the invention is to provide a control apparatus for an engine accelerator which will hold the accelerator in a predetermined, advanced position but which will not prevent the accelerator from being advanced still further, if desired.

In brief, a control system embodying the invention includes a magnetic member movable in a fixed path. A connection is provided between the magnetic member and the engine accelerator whereby the member is movable in response to movement of the accelerator. An electromagnet is located in effective relation with the magnetic member, and means are provided for energizing the electromagnet to immobilize the member and thereby hold the accelerator in desired position.

Other objects, advantages and details of the invention will be apparent as the description proceeds, reference being had to the accompanying drawing wherein one form of the invention is shown. It is to be understood that the description and drawing are illustrative only and that the scope of the invention is to be measured by the appended claim.

In the drawing:

Fig. 1 is a more or less diagrammatic view, partly in section, of an accelerator control system embodying the invention, the control system being installed in a motor vehicle, and Fig. 2 is an enlarged view on line 2—2 of Fig. 1.

Referring now to Fig. 1 of the drawing, the numeral 5 designates the pedal accelerator of a conventional motor vehicle. Accelerator 5 is connected by a link 6 to a pivoted lever 7 which in turn is connected by links 8 and 9 to a rotatable butterfly valve 10 mounted on a shaft 11. Valve 10 is located in duct 12 extending between a carburetor (not shown) and the fuel intake manifold (not shown) of an engine.

A spring 14 biases accelerator 5 and associated elements to idling position, that is, to a position where valve 10 is nearly closed. As accelerator 5 is depressed or advanced, the links and lever 6, 7, 8 and 9 rotate valve 10 to more open positions, thereby to increase the fuel intake of the engine.

Although an internal combustion engine for a motor vehicle is here referred to, and the accelerator, valve and linkages are of the type used with such an engine, it will be understood that the invention may be used with engines of other types, such as electric engines, which are provided with an accelerator element.

The numeral 15 designates a steering wheel carried at the end of a steering wheel column 16. A switch 17 is mounted on steering wheel 15, switch 17 being the conventional horn switch in the illustrated form of the invention. As previously mentioned, the horn switch may form an element of the control system, particularly if it is provided with a horn ring so the switch can be actuated by one of the operator's hands when held in normal driving position. In the absence of a horn ring, as in the case of some trucks, switch 17 preferably is a separate switch installed either on the steering wheel rim or one of the steering wheel spokes adjacent the rim.

As here shown, the control system includes a base plate 20 mounted adjacent some part of the linkage extending between accelerator 5 and butterfly valve 10, or other element on the engine which is moved to control engine acceleration and speed.

Mounted on base plate 20 is a magnetic member 22 which is movable on a fixed path. As here shown, member 22 is in the form of a disk mounted for rotation on a bracket 23, the latter being carried by mounting plate 20. Member 22 carries a pin 25 near its periphery, and this pin is movable on a fixed path as member 22 rotates. Alternatively, member 22 may be mounted on shaft 11 of butterfly valve 10.

Pin 25 is connected to juncture 26 on the accelerator linkage by means of element 28 which may be either stiff or flexible. If flexible, accelerator 5 may be advanced further when the system is in operation, as will be seen, whereas further advance during system operation is not possible if the element is stiff.

Referring to Fig. 2, magnetic disk member 22 may be biased by means of spiral spring 30 to rotate in clockwise direction. This bias is opposed by element 28 which extends between pin 25 and juncture 26 of links 8 and 9. Thus, assuming element 28 is flexible, spring 30 insures that plate 22, when free to move, will rotate in accordance with the movement of the accelerator linkage. When accelerator 5 is at idling position, member 22 will be at an extreme counterclockwise position. As accelerator 5 is advanced, spring 30 is effective to rotate member 22 in such manner that no slack develops in element 28. In other words, member 22 moves in response to movement of accelerator 5. However, with this arrangement (flexible element 28), accelerator 5 may be advanced when member 22 is immobilized.

An electromagnet 32, carried on a bracket 33, is mounted in effective relation with magnetic member 22. Bracket 33 is suitably mounted on base plate 20.

Magnetic member 22 has a loose or wobble rotatable relation with its supporting bracket 23, so that when electromagnet 32 is energized, member 22 will be attracted thereto and immobilized against further rotation until such time as electromagnet 32 is deenergized.

Means are provided for energizing electromagnet 32 when accelerator 5 has been advanced to predetermined position and it is desired to put the system in operation. Such means include a voltage source or battery 35 and the aforesaid switch 17. If the aforesaid switch 17 is not the conventional horn switch but rather a separate switch mounted on the steering wheel, the series connected switch and voltage source merely are connected to the terminals of electromagnet 32.

In the form of the invention illustrated, switch 17 is the conventional horn switch, and, accordingly additional elements are provided in order alternatively to use switch 17 as the horn switch and as a control switch for the present system.

The numeral 40 designates a relay which includes two movable armature arms 41 and 42. These armature arms form parts of certain switches which now will be described.

The switch including armature arm 41 has armature terminal 43 and alternative terminals 44 and 45. Armature arm 41 is biased against terminal 45, and it moves into engagement with terminal 44 when relay 40 is energized.

The switch including armature arm 42 has armature terminal 47 and alternative terminals 48 and 49. Armature arm 42 is biased against terminal 49 and it moves into engagement with terminal 48 when relay 40 is energized.

A conductor 50 extend between armature terminal 43 and one side of horn switch 17. The other side of switch 17 is grounded. Switch terminal 45 is connected by conductor 52 to one side of a relay 53, this relay being the conventional horn relay in the motor vehicle. The other side of this relay is connected to the positive terminal of battery 35.

Dash line 55 extending between conductors 50 and 52 illustrates the original connection between horn switch 17 and relay 53. This connection is broken when the control system is installed and the broken ends are connected respectively to terminals 43 and 45.

Referring back to electromagnet 32, one side of the electromagnet is grounded, as shown, and the other side is connected by conductor 56 to armature terminal 47. Switch terminal 48 is connected by conductor 58 to the positive side of voltage source or battery 35.

A conductor 60 extends from the positive side of battery 35 to one side of the coil of relay 40. The other coil side is connected both to switch terminal 44 and by means of conductor 62 to one side of an auxiliary switch 64. The other side of auxiliary switch 64 is grounded.

Auxiliary switch 64 is preferably of the push-button type and it is mounted in a convenient location such as the dashboard just forwardly of steering wheel 17. Switch 64, as will be seen, is effective to energize relay 40 and deactivate the conventional horn circuit, as well as initially to energize electromagnet 32. The reference numerals 65 designate biasing means, such as springs, which urge horn switch 17 and auxiliary switch 64 to open position and urge armature arms 41 and 42 to the switch positions shown in Fig. 1.

Operation of the control system is as follows:

When it is desired to employ the system, accelerator 5 is depressed until predetermined drive speed is attained. Auxiliary switch 64 next is depressed to establish a circuit through relay 40, the circuit including battery 35, conductor 60, relay 40, conductor 62 and switch 64. This energizes relay 40 and moves armature arms 41 and 42 to the opposite positions from those shown in the drawing.

The armature switch circuit from battery 35 through conductor 58, terminal 48, armature arm 42, terminal 47 and conductor 56 energizes electromagnet 32 which attracts magnetic member 22 and immobilizes the member in its then position. The connection comprising element 28 between member 22 and the accelerator linkage juncture 26 serves to hold butterfly valve 10 in its then advanced position.

Immediately after closing auxiliary switch 64, the operator closes horn switch 17 which completes a "hold" circuit including switch 17, conductor 50, armature terminal 43, armature arm 41, switch terminal 44, relay 40, conductor 60 and battery 35. Thereafter auxiliary switch 64 may be opened by releasing the push-button.

As long as horn switch 17 is closed, relay 40 continues to be energized to hold armature arms 41 and 42 respectively in contact with terminals 44 and 48. As previously mentioned, the circuit through terminal 48 and armature arm 42 is the one which maintains electromagnet 32 in energized condition.

The control system remains in operation as thus described as long as horn switch 17 is closed. When switch 17 is released, the circuit through relay 40 is broken and the relay is deenergized thus permitting armature arms 41 and 42 to return to the illustrated positions. When this occurs, electromagnet 32 is deenergized to allow accelerator 5 and valve 10 to be used in conventional manner.

From the above description it is thought that the construction and advantages of my invention will be readily apparent to those skilled in the art. Various changes in detail may be made without departing from the spirit or losing the advantages of the invention.

Having thus described my invention, what I claim as new and desire to secure by Letters Patent is:

A control system for holding an engine accelerator in a motor vehicle in predetermined drive position comprising an accelerator, a member movable in a fixed path, a connection between said member and said accelerator whereby said member is movable in response to movement of said accelerator, an electromagnet in effective relation with said member, and means energizing said electromagnet to immobilize said member and thereby hold said accelerator in desired position, said means energizing said electromagnet comprising a voltage source and a switch means in series therewith connected to said electromagnet, said switch means including a portion of a horn circuit and a horn switch for energizing said horn circuit, an auxiliary switch, both of said switches being biased to open position, and means responsive to momentary closure of said auxiliary switch closing said switch means to energize said electromagnet and disconnecting said horn switch from said horn circuit to open said horn circuit and rendering said horn switch, when manually closed, effective to maintain said switch means in closed condition and thus maintain said electromagnet energized until release of said horn switch.

References Cited in the file of this patent

UNITED STATES PATENTS

| | | |
|---|---|---|
| Re. 23,408 | Wisely | Sept. 4, 1951 |
| 2,228,393 | Leaming | Jan. 14, 1941 |
| 2,638,016 | Munson | May 12, 1953 |
| 2,690,824 | Forman | Oct. 5, 1954 |
| 2,712,762 | Pavlik | July 12, 1955 |
| 2,765,671 | Francis | Oct. 9, 1956 |